United States Patent [19]

Andrews et al.

[11] Patent Number: 4,744,848

[45] Date of Patent: May 17, 1988

[54] METHOD OF FORMING A CONTOURED SHAPE

[75] Inventors: Joseph B. Andrews, West Bloomfield; Chris G. Hewett, Birmingham; Thomas M. Smith, Westland, all of Mich.

[73] Assignee: RHJ Products, Inc., Franklin, Mich.

[21] Appl. No.: 10,068

[22] Filed: Feb. 2, 1987

[51] Int. Cl.⁴ .......................... B31F 1/00; B27N 3/10; B28B 11/08; B29C 55/00

[52] U.S. Cl. .................... 156/224; 156/229; 156/500; 264/257; 264/292; 425/383

[58] Field of Search ............... 156/224, 221, 220, 222, 156/212, 245, 196, 229, 443, 492, 500, 228; 264/511, 534, 571, 292, 257, 258, 322, 512; 425/340, 383, 390, 395, 451.9

[56] References Cited

U.S. PATENT DOCUMENTS

| | | | |
|---|---|---|---|
| 3,542,616 | 11/1970 | Cain et al. | 156/224 |
| 3,673,034 | 6/1972 | Squier | 156/224 |
| 3,938,725 | 2/1976 | Hardwick et al. | 156/224 |
| 3,943,215 | 3/1976 | Grüne et al. | 264/468 |
| 4,052,241 | 10/1977 | Walter | 156/245 |
| 4,114,213 | 9/1978 | Beernaerts | 264/257 |
| 4,260,576 | 4/1981 | Pollard | 156/228 |
| 4,261,775 | 4/1981 | Tschudin | 150/224 |
| 4,490,205 | 12/1984 | Warhol | 156/224 |
| 4,555,378 | 11/1985 | Martin et al. | 264/219 |
| 4,565,517 | 1/1986 | Brinkmann et al. | 425/451.9 |
| 4,614,558 | 9/1986 | Kobe | 156/212 |

Primary Examiner—Donald E. Czaja
Assistant Examiner—Louis Falasco
Attorney, Agent, or Firm—Cullen, Sloman, Cantor, Grauer, Scott & Rutherford

[57] ABSTRACT

The method of this invention is particularly suitable for forming a permanently deep drawn contour in a laminate, such as a self-supporting polymer backed carpet laminate utilized by the automotive industry. The method includes forming a generally planar laminate wherein the carpet or cloth finish sheet is spaced from the sides of the polymer sheet, releasably clamping the polymer backing sheet to the side members of a frame assembly including a portion which is hingedly attached to the side members adjacent the area where the deepest draw is to be formed in the laminate. The laminate is then heated in the frame assembly and formed in a die press having at least one die member which is received in forming contact with the laminate between the side members. In the die forming step, the carpet or finish sheet floats on the polymer backing sheet and the hinged portion of the frame assembly floats relative to the side members to approximately mid way between the areas of greatest and least contour of the die member, such that stretching of the carpet-polymer laminate is minimized.

15 Claims, 4 Drawing Sheets

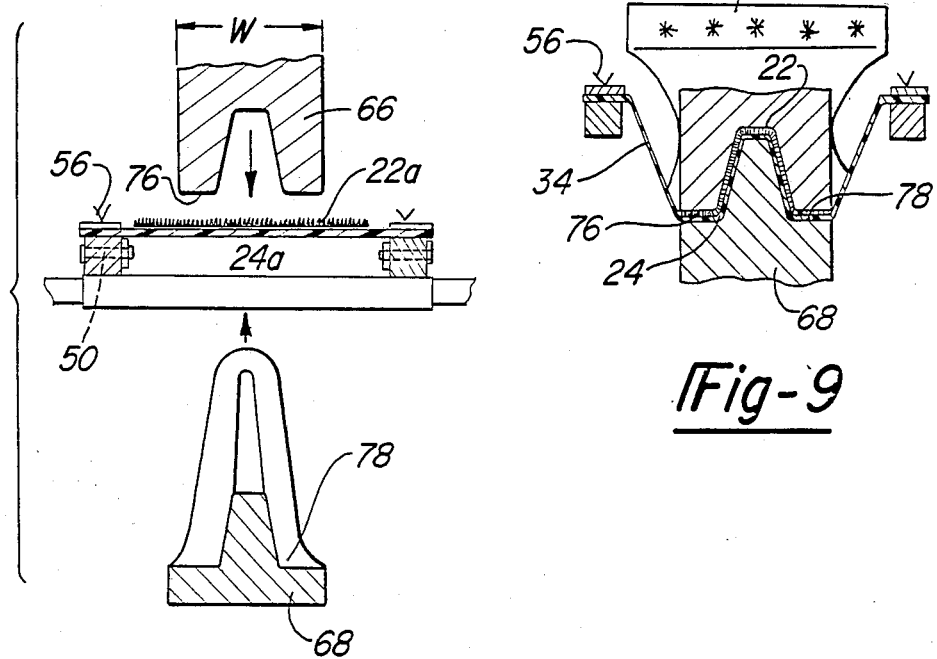
*Fig-7*
*Fig-9*
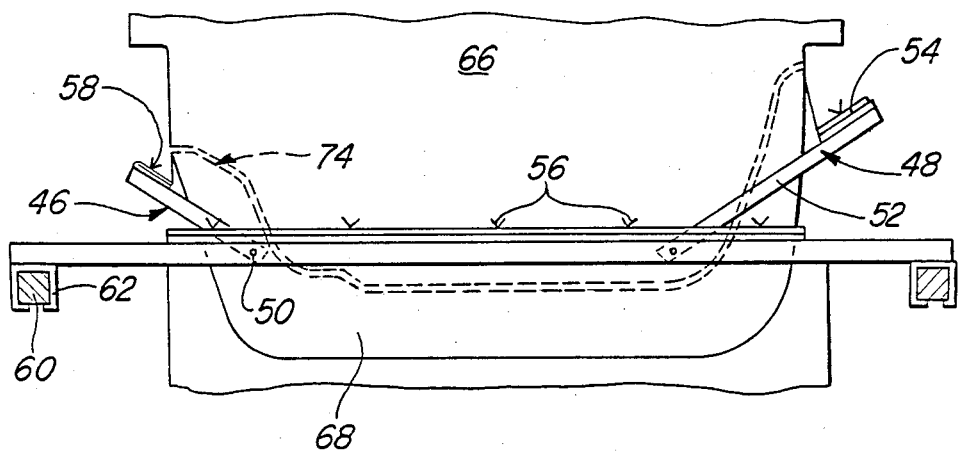
*Fig-8*

METHOD OF FORMING A CONTOURED SHAPE

FIELD AND BACKGROUND OF THE INVENTION

It is very difficult to form a deep drawn contour in a laminate having a finish sheet, such as a self-supporting polymer backed carpet laminate, without stretching or tearing the carpet or finish sheet. Such laminates are used by the automotive industry for vehicle interior coverings, including deck lids, side and front panels, interior wheel covers for vans, center consoles and deep drawn door sills. The prior methods do not allow deep drawing of a carpet laminate, for example, particularly where the laminate must be drawn in more than one area, such as the ends of a deep drawn door sill.

One prior art method includes forming a plastic shell or substrate and then bonding the finish sheet over the contoured surfaces of the formed plastic substrate. This, of course, often results in poor bonding, gaps, mismatching, etc. It is also common to incorporate a manual positioning of the sheet stock in a die press, with or without a frame, and complex fixed frame assemblies have been utilized to reduce the stretching of the finish sheet in a die forming operation. These methods often result in stretching and tearing of the carpet or woven finish sheet, particularly where the laminate is deeply drawn by the die members.

The need therefore remains for a method of forming a permanently deep drawn contour in a sheet or panel, particularly a laminate having a woven finish sheet and a plastic substrate, such as a polymer backed carpet. The method of this invention is particularly suitable for forming deep drawn contours in such laminates, without tearing the carpet or finish sheet.

SUMMARY OF THE INVENTION

The method of this invention avoids the problems of the prior art by allowing the woven finish sheet or carpet to free form or "float" on the polymer substrate in the die press, limiting the stretching of the finish sheet and the frame assembly permits the laminate to move or float against the forming die to approximately midway between the areas of greatest contour of the die member. The forming step of the method of this invention may be performed within a single vacuum forming die or, more preferably, the method of this invention may be performed in a conventional die set having opposed relatively movable mating contoured male and female die members.

The method of forming a permanently deep drawn contour of this invention includes first releasably clamping a thermoplastic sheet in a frame assembly having opposed spaced side members and a hinged portion having a free end which is hingedly attached to the side members adjacent the area where the deepest draw is to be formed in the sheet. Where the method of this invention is used to form a deep drawn contour in a laminate, such as a self-supporting thermoplastic backed woven or carpet laminate, the carpet or woven finish sheet is first bonded on the thermoplastic sheet with the side edges of the finish sheet spaced from the side edges of the thermoplastic sheet. The unformed laminate thus includes exposed side margins of the thermoplastic sheet which are clamped by conventional clamping means on the side members of the frame assembly. As described below, the carpet or finish sheet is thus permitted to free flow or float on the thermoplastic sheet during the forming step. The finish sheet is also releasably clamped to the free end of the hinged portion of the frame assembly. The sheet or laminate is then heated to soften the thermoplastic sheet to the forming temperature, such that the thermoplastic sheet and the carried finish sheet may be permanently contoured in a die press.

The frame assembly and heated sheet is then placed in a die press having at least one contoured die member which is receivable between the side members of the frame assembly and which has an area of greatest contour adjacent the hinged portion of the frame assembly. The frame assembly and die member are then moved relative to each other to bring the die member into forming engagement with the heated thermoplastic sheet between the side members of the frame assembly. In the most preferred method of this invention, the die press includes opposed relatively movable mating contoured male and female die members and the die press is closed by relatively moving the die members into forming engagement with the laminate. As will now be understood, the free end of the hinged portion of the die assembly will float as the thermoplastic sheet or laminate is formed by the die members to approximately midway between the areas of greatest contour of the die member or members, thus substantially reducing any stretching or tearing of the woven finish sheet or carpet. The sheet or carpet laminate is then cooled and the thermoplastic sheet is cured, preferably in the die press, to the contoured shape of the die member or members.

In the most preferred method of forming an open ended contoured shape of this invention, such as used by the automotive industry for various interior panels including the complex deep drawn door sill disclosed herein, the frame assembly includes a rectangular carrier frame, including the side members described above, and the hinged frame portion is located adjacent one or both ends of the frame assembly. The hinged portion includes side portions which are hingedly attached to the side members and a free end portion which receives an end margin of the thermoplastic sheet. The method of this invention then includes releasably clamping an end margin of the thermoplastic sheet to the hinged free end portion of the frame assembly and the end portion of the sheet or laminate thus rotates about the hinged connection and floats to approximately midway between the areas of greatest contour in the die member, forming an open ended contoured configuration.

In the method of this invention, the exposed margins of the thermoplastic sheet will stretch and thin during the forming step, however these portions are scrap. In the most preferred method of this invention, the thermoplastic substrate of the laminate remains of constant thickness, providing a self-supporting contoured structure. That is, the portions of the thermoplastic sheet which are part of the laminate are not thinned or stretched. This may be accomplished by providing side margins on the mating die members which close against the laminate and prevent stretching of the thermoplastic sheet in the critical areas.

Other advantages and meritorious features of the present invention will be more fully understood from the following description of the preferred embodiments, the appended claims and the drawings, a brief description of which follows.

BRIEF DESCRIPTION OF THE DRAWINGS

FIG. 7 is an end view of the forming station shown in FIG. 6, partially cross-sectioned;

FIG. 8 is a side view, similar to FIG. 6, following the closing of the die members;

FIG. 9 is an end cross-sectional view of the forming station, similar to FIG. 7, following the closing of the die members;

DETAILED DESCRIPTION OF THE PREFERRED EMBODIMENTS OF THE METHOD OF THIS INVENTION

Figure 1:
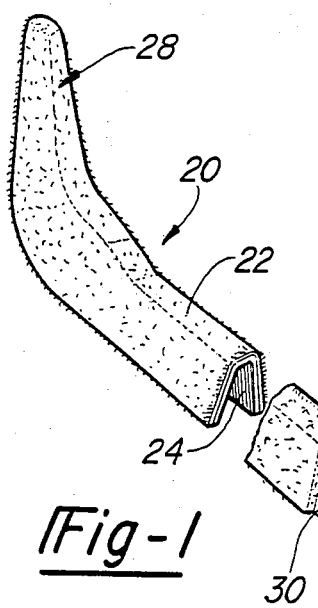
FIG. 1 is a top elevation, partially cross-sectioned, of a complex deep drawn open ended carpet laminate which may be formed by the method of this invention.

As described above, the method of this invention is particularly useful for forming a permanent deep drawn contoured shape, such as the open ended contoured laminate shown at 20 in FIG. 1. The disclosed contoured laminate was designed for the door sill of a high performance sports car wherein the passenger sits relatively low in the vehicle chassis. The disclosed laminate is generally U-shaped, as shown by the cross-section, and includes a woven cover sheet or carpet 22 and a thermoplastic substrate 24. The forward open end portion 26 and rearward open end portion 28 are deeply drawn and contoured to fit the forward and rearward ends respectively of the interior door sills of the vehicle. The disclosed configuration also includes an indent 30 which receives the parking brake handle and lever in an actual installation.

As disclosed herein, the method of this invention may be used to form various complex and deep drawn contours and configurations. The materials will therefore depend upon the particular application of the method of this invention. A suitable thermoplastic substrate for the particular application of the method of this invention illustrated in FIG. 1 is an "ABS" plastic having a thickness ranging from about 0.060 to 0.50 inches, although the preferred thickness is greater than 0.100 inches to accommodate the stretching of the exposed margins and provide a self-supporting structure. The ABS plastics family is based upon combining three monomers, namely acrylonitrile, butadiene and styrene, to make a wide variety of polymeric products. Suitable ABS plastics include DOW 500 or 550 ABS manufactured by Dow Chemical Co. of Midland, Mich. As will be understood, however, various other thermoplastic materials may also be used. The finish or cover sheet 22 will also depend upon the particular application and may include any cover material suitable for the particular application. As understood, however, the method of this invention is particularly suitable for non-stretchable materials, including the carpet shown in FIG. 1 and various woven materials. The method of this invention has been used to form various carpets, including carpets which are very difficult to form by other methods, such as 16 ounce cut pile nylon carpeting and bulk continuous filament carpet having polymer or latex backing.

Figure 3:
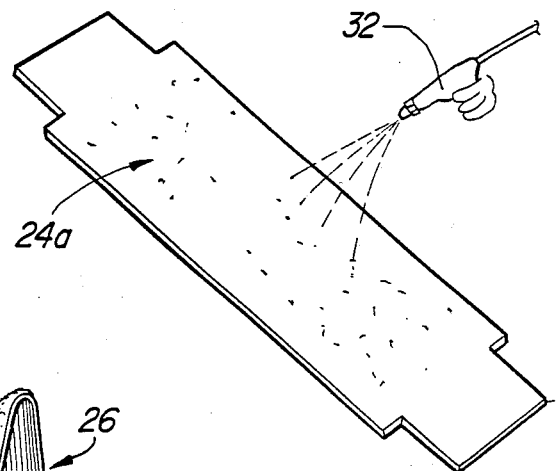
FIG. 3 is a top elevation of a thermoplastic sheet which may be utilized in the method of this invention illustrating the method of bonding a carpet or finish sheet to the thermoplastic sheet.
Figure 2:
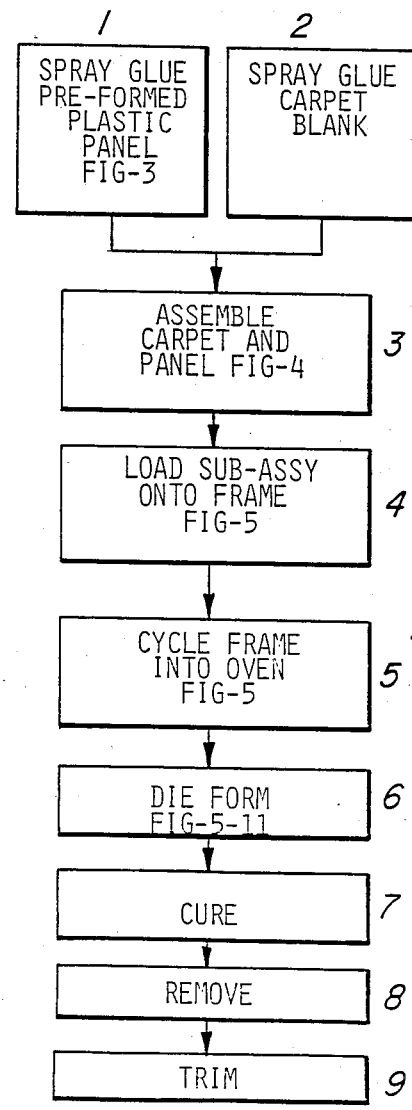
FIG. 2 is a book diagram illustrating a commercial application of the method of this invention.
Figure 4:
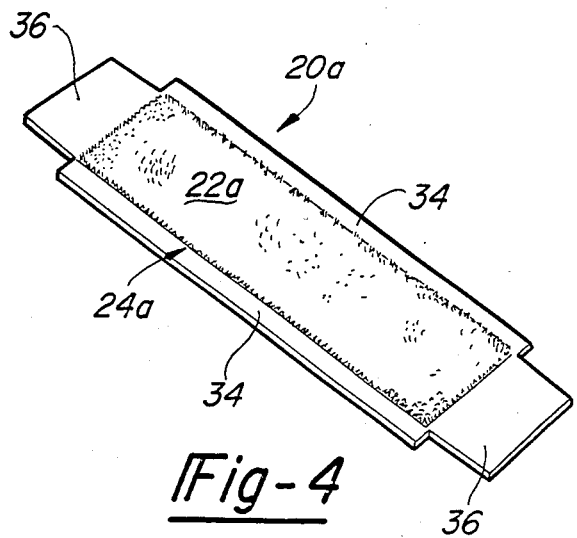
FIG. 4 is a top elevation of a carpet laminate which may be utilized in the method of this invention.

FIG. 2 illustrates a commercial application of the method of this invention in block form. As shown in blocks 1, 2 and 3, the first step is to assemble or form the laminate panel. In the method shown, the flat carpet section 22a (see FIG. 4) is bonded to a larger thermoplastic sheet 24a by applying an adhesive or glue on the preformed plastic panel or sheet 24a, see block 1 of FIG. 2, as shown in FIG. 3. In most commercial applications, the glue or adhesive may be efficiently applied with a spray gun 32 as shown in FIG. 3. As set forth in block 2 of FIG. 2, the glue or adhesive is also normally applied to the back surface of the carpet to assure a uniform bond. As best shown in FIG. 4, the finish sheet or carpet 22a preferably has a smaller width and length than the thermoplastic sheet 24a, such that the carpet is spaced from the side edges and the ends of the thermoplastic sheet 24a to define side margins 34 and end margins 36 of the thermoplastic sheet for attachment of the laminate in a frame assembly, as described hereinbelow.

Figure 5:
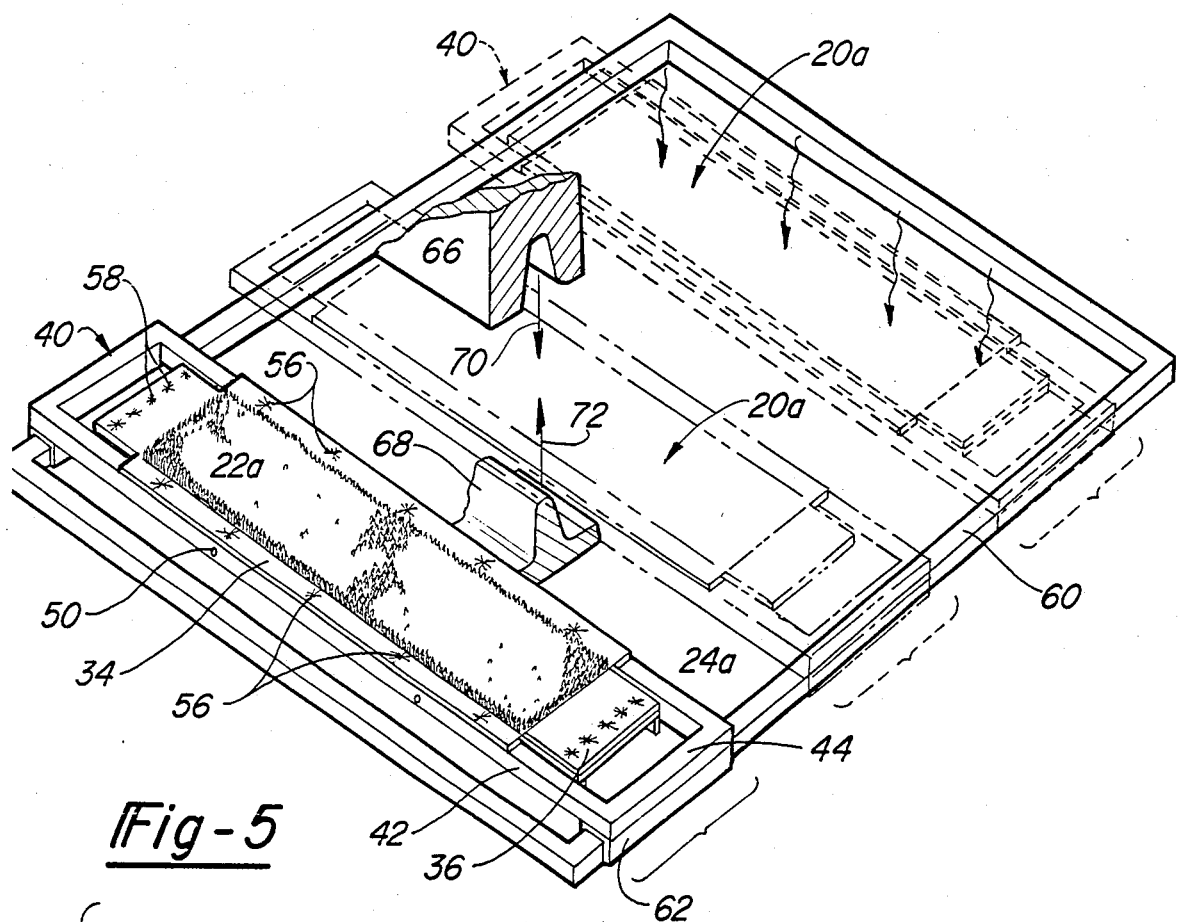
FIG. 5 is a top elevation illustrating a commercial application of the method of this invention with the die members cross-sectioned and the second and third stations in phantom.
Figure 6:
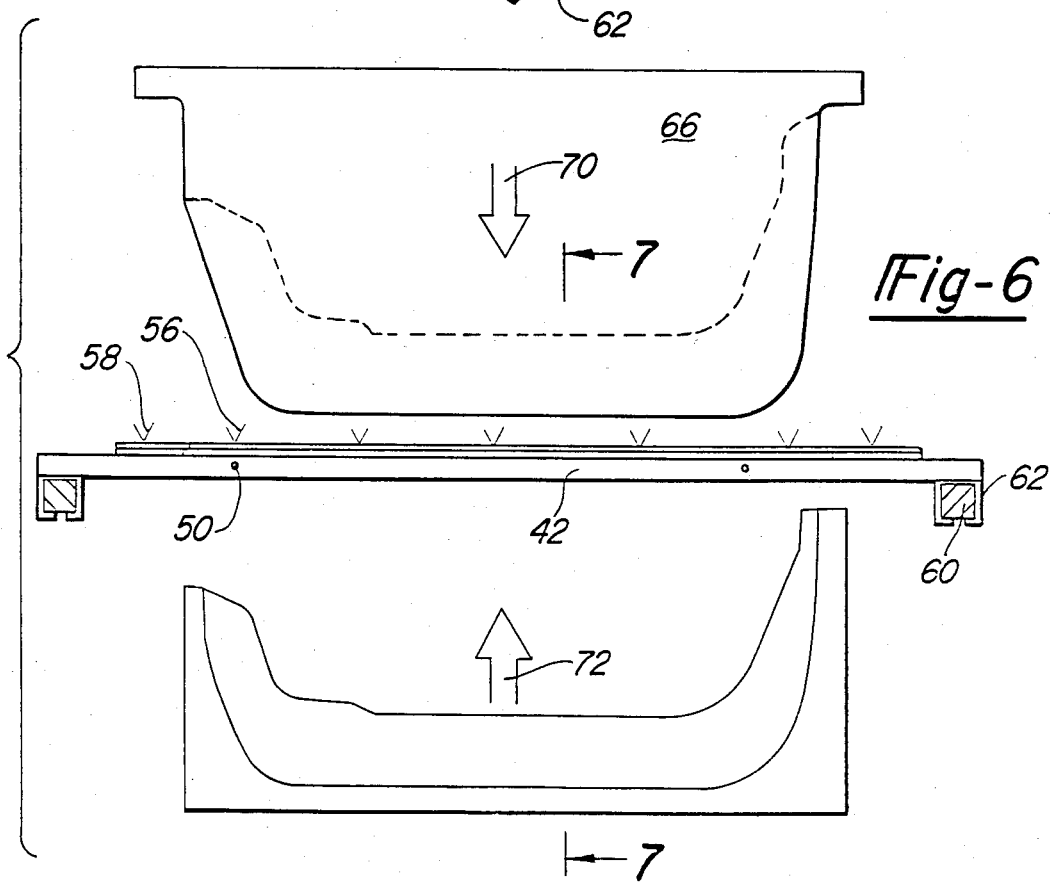
FIG. 6 is a side view illustrating the forming station, partially cross-sectioned.
Figure 10:
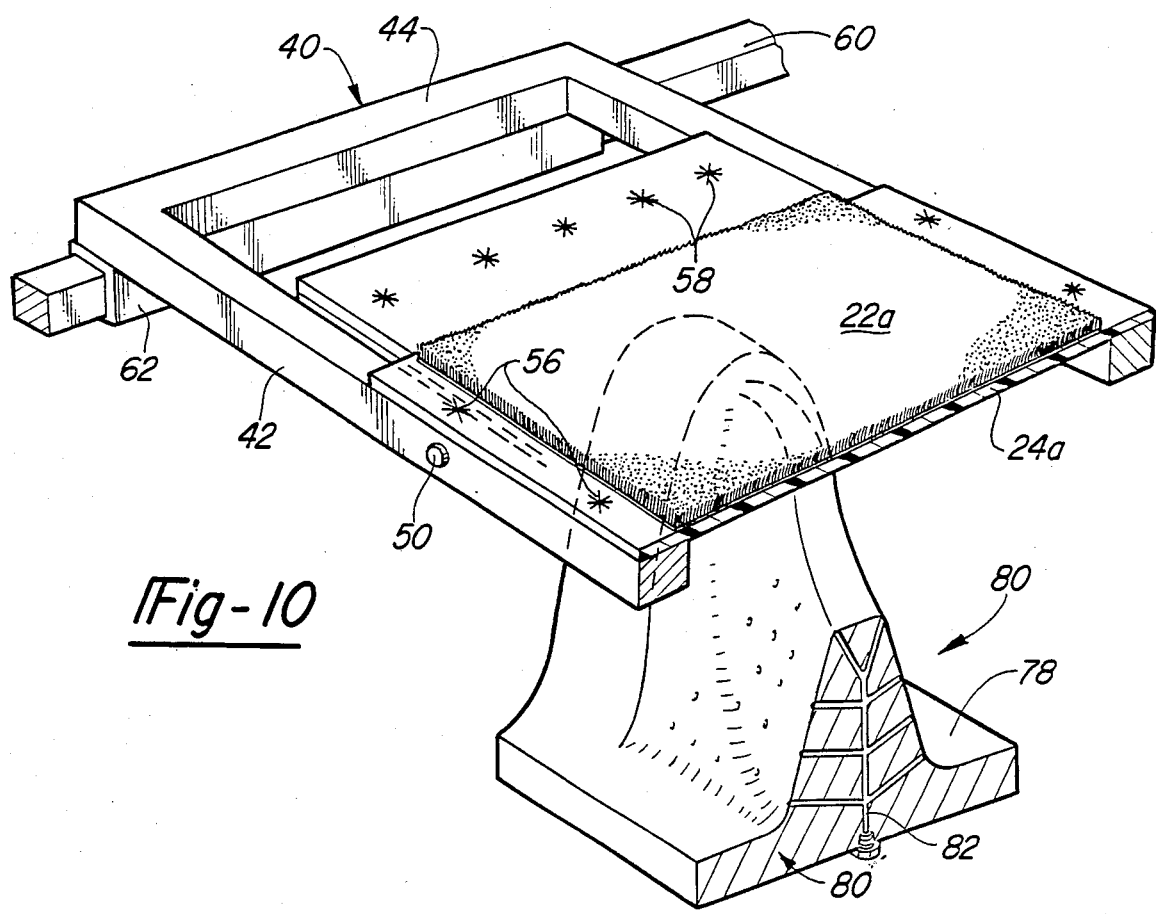
FIG. 10 is a partial top elevation of a second embodiment of a die station which may be used in the method of this invention.
Figure 11:
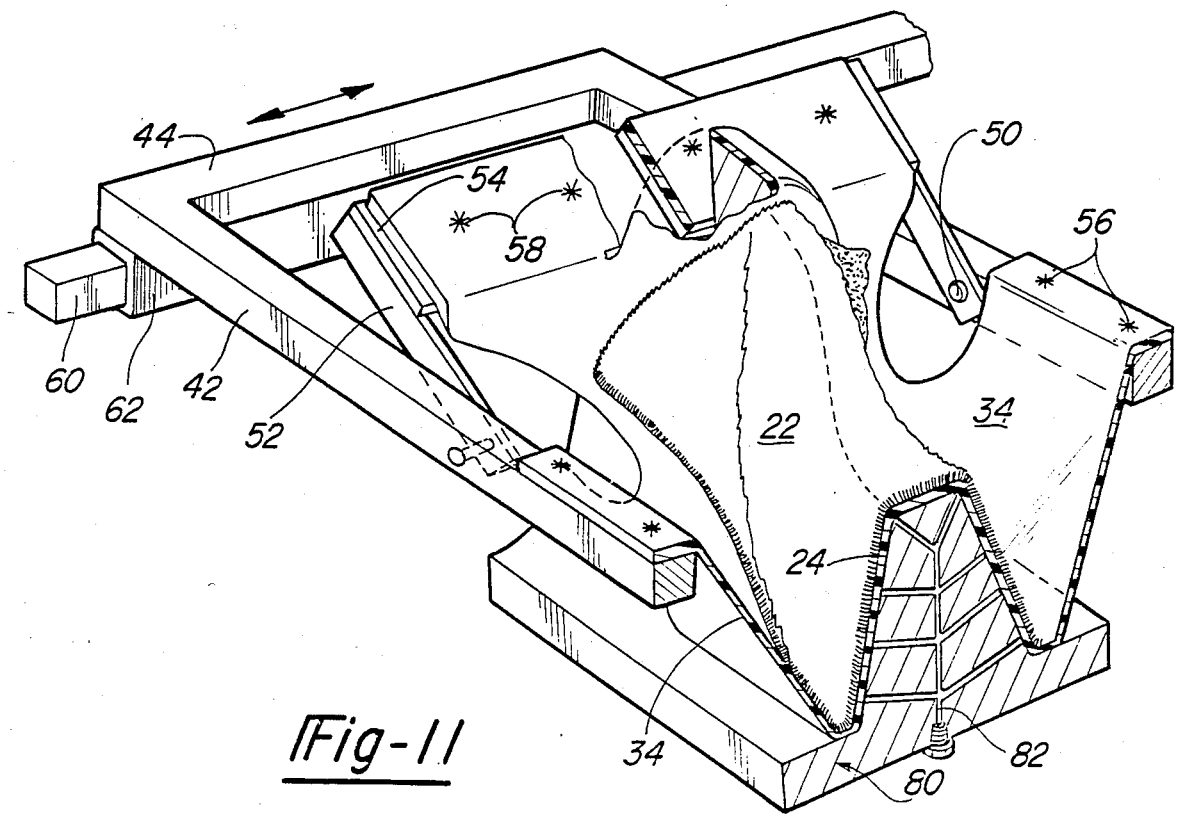
FIG. 11 illustrates the forming step of the die illustrated in FIG. 10.

The preferred embodiment of the frame assembly 40 is best shown in FIGS. 5, 10 and 11. As shown, the frame assembly includes a carrier frame having spaced side frame members 42 and end frame members 44. As best shown in FIGS. 8 and 11, the frame assembly further includes hinged portions 46 and 48 which are hingedly attached to the side frame members 42 by hinge pins 50. The hinged portions 46 and 48 each include side portions 52 which are hingedly attached to the side frame members 42 by hinge pins 50 and a free end portion 54 which receives the ends of the thermoplastic sheet 24. The flat sheet is designated 24a as shown in FIG. 10 and the formed contoured sheet is designated 24, as shown in FIG. 11. The side margins 34 of the thermoplastic sheet are releasably clamped to the side members 42 of the carrier frame by conventional industrial clamping means (not shown) at various locations 56 along the length of the thermoplastic sheet, as best shown in FIGS. 5, 10 and 11. Similarly, the end margins 36 are releasably clamped to the free end portions 54 of the hinged portion 46 at various locations 58, such that the thermoplastic sheet 24a is firmly attached on the frame assembly 40 and the finish sheet or carpet 22a is free to float or free form during the molding process, as described hereinbelow.

After the laminate 20a has been loaded on the frame assembly as described above and shown at box 4 of FIG. 2, the frame assembly and laminate is heated in a suitable heat station, as shown in FIG. 5 and box 5 of FIG. 2. In the disclosed embodiment, the apparatus includes end rails 60 and the frame assembly includes channels 62 which assist in transfer of the frame assembly 40 to the different stations. The heat station may be a conventional radiant heater or oven (not shown) which receives the frame assembly and laminate to heat the thermoplastic sheet to the desired temperature for forming. Where an ABS plastic is used, for example, the preferred temperature for forming is between about 300° to 500°0 F. When the thermoplastic sheet is at the desired temperature, the frame assembly and laminate is then moved to the molding or forming station where the laminate is formed into the desired shape, as shown at block 6 of FIG. 2 and now described.

In the method shown in FIGS. 5 to 8, the laminate is formed by a pair of opposed matched female and male die members, 66 and 68, respectively. As best shown in FIGS. 7 and 9, the width "W" of the die members are substantially less than the width between the opposed side members 42 of the frame assembly and the frame assembly is centered on the die members, such that the die members 66 and 68, may be received between the side members 42. As shown by arrows 70 and 72, the die members 66 and 68, respectively, are then relatively closed to form the planar laminate 20a into the desired contoured shape 20. As will be understood, however, the planar laminate 20a is formed by bringing the die members into forming contact with the laminate and therefore the frame assembly may be moved relative to one of the die members, eliminating the requirement for a double reciprocal press. The die members 66 and 68 are normally attached to die platens (not shown) which are secured to and supported within a conventional die press.

As best shown in FIG. 8, the hinged portions 46 and 48 of the frame assembly 40 will rotate about the pivot axes provided by pivot pins 50 to approximately midway between the areas of greatest contour of the die members. In the preferred embodiment, the hinged members 46 and 48 "float" in the die press to assume an optimum position during forming to avoid tearing or stretching of the woven finish sheet or carpet. As shown in FIG. 1, the forward end 26 of the contoured laminate formed by the method of this invention has a lesser draw than the rearward end 28. Thus, the hinged member 46 has a shorter length than the hinge member 48 where the deeper draw 28 is formed. As will be understood, the laminate is trapped in the parting line 74 of the die members during forming. As shown by comparing FIGS. 7 and 9, the die members 66 and 68 preferably include mating margins 76 and 78, respectively and the "length" of the die surfaces measured along the U-shaped configuration is approximately equal to the width of the laminate, such that the mating marginal surfaces 76 and 78 entrap the laminate 20, stretching and thinning the marginal edge 34 of the thermoplastic sheet while the thickness of the thermoplastic sheet in the mold remains substantially constant.

The importance of clamping the marginal edges 34 and 36 of the thermoplastic sheet to allow the finish sheet 22 to free form or float on the plastic sheet will now be understood. As best shown by comparing FIGS. 7 and 9, the planar carpet 20a is not clamped on the side frame members 42 and the carpet 22a is therefore free to "float" on the heated thermoplastic sheet 24a as the die members 66 and 68 begin to form the laminate 20. The margins 34 and 36 are stretched and thinned during the forming process, but the carpet is folded and shaped in the die assembly without any substantial stretching of the carpet. Thus, the carpet 22 free forms in the die assembly without tearing the carpet. Further, as described above, the hinged portions 46 and 48 of the frame assembly permit the formation of relatively deep draws in the laminate, without stretching or tearing the carpet. As will be understood, the method of this invention is therefore particularly suitable for forming a laminate wherein the laminate includes a woven or non-stretchable finish sheet, such as a carpet, which may tear upon stretching.

FIGS. 10 and 11 illustrate what may be considered an alternate embodiment of the molding step. The frame assembly 40 and laminate 22a may be identical to the frame assembly and laminate described herein above and are therefore numbered the same. The die member 80 in the illustrated embodiment is a vacuum die having a series of vacuum channels 82 which draw the flat laminate 22a against die member 80 into the configuration 22 shown in FIG. 11. Otherwise, the process is identical to the process described hereinabove. Alternatively, FIGS. 10 and 11 may be considered an exploded view of the forming method described in FIGS. 6 to 9 with the upper die not shown for clarification. FIGS. 10 and 11, however, illustrate that it is possible to die form the laminate without requiring a pair of opposed matching dies.

Following the die form step shown in Box 6 of FIG. 2, the thermoplastic sheet of the formed laminate is allowed to cool and cure in the die formed configuration as shown at block 7 of FIG. 2. In a normal commercial application, the laminate is "cured" in the die formed configuration in the die and cooling water or fluid is circulated in the die to reduce the cooling time. The self-suypporting laminate is then removed from the die as shown at block 8 of FIG. 2 and the laminate is then trimmed to the desired configuration, as shown in FIG. 1.

As will be understood, various modifications may be made to the method of forming a permanently deep drawn contour of this invention within the purview of the appended claims. As set forth above, the method of this invention may be used to form various contours and configurations. It is also possible to use the method of this invention to form a thermoplastic sheet rather than a laminate, although many of the advantages of the method of this invention will be lost. The disclosed embodiment of the laminate 20 shown in FIG. 1 has deep drawn open end portions. Obviously, it is also possible to form a laminate having only one deep drawn open end portion with the disclosed apparatus. Further, it is possible to hinge a midportion of the frame assembly to form a deep drawn midportion of the laminate. This could be accomplished for example by an articulated frame assembly wherein the side frame members are free to slide longitudinally on the side frame members are free to slide longitudinally on the side rails and the hinged portions include a center hinge and the portions are hinged to the slidable side members. Where a laminate is to be formed, the non-stretchable portion of the laminate should not be clamped down, as described above. The method of bonding the nonstretchable fabric or carpet will also depend upon the particular application. For example, the carpet may include a plastic backing material which may be heat bonded to the thermoplastic substrate. Various adhesives may also be used, depending upon the material of the finish sheet and the substrate. The method of this invention is therefore quite flexible depending upon the materials and the configuration of the part to be formed.

We claim:

1. A method of forming a permanently deep drawn contour in a thermoplastic sheet, said method comprising:
    (a) releasably clamping said thermoplastic sheet in a frame assembly, said frame assembly having opposed spaced side members, clamping means releasably clamping a marginal edge of said thermoplastic sheet to said side members, and said frame assembly having a hinged portion hingedly attached to said side members, said frame assembly hinged portion located adjacent the area where the deepest draw is to be formed in said thermoplastic sheet;

(b) heating said thermoplastic sheet in said frame assembly to soften said thermoplastic sheet to the forming temperature;

(c) placing said frame assembly and heated thermoplastic sheet in a die press having a contoured die member, said die member receivable between said frame assembly side members and having an area of greatest contour adjacent said frame assembly hinged portion;

(d) relatively moving said die member into forming engagement with said heated thermoplastic sheet between said frame side members, said frame assembly hinged portion floating relative to said side members as said thermoplastic sheet is formed by said die member to approximately midway between the areas of greatest and least contour of said die member; and (e) cooling to harden said thermoplastic sheet in the contoured shape of said die member.

2. The method of forming a permanently deep drawn contour in a thermoplastic sheet as defined in claim 1, wherein said frame assembly includes a carrier frame including said side members, said hinged frame portion located adjacent one end of said frame assembly and including spaced side portions hingedly attached to said side members and an end portion receiving an end portion of said thermoplastic sheet, said method including releasably clamping said thermoplastic sheet end portion to said frame assembly hinged end portion and said hinged end portion floating as said thermoplastic sheet is formed by said die member to approximately midway between the areas of greatest and least contour of said die member.

3. The method of forming a permanently deep drawn contour in a thermoplastic sheet, as defined in claim 1, wherein said sheet includes a woven finish sheet permanently bonded on said thermoplastic sheet, said method including first forming a laminate by bonding said woven finish sheet on said thermoplastic sheet, said woven finish sheet having a width which is less than the width of said thermoplastic sheet and said thermoplastic sheet having side margins on opposed sides of said woven finish sheet, said method then including releasably clamping said thermoplastic sheet side margins to said frame assembly side members, heating said laminate, placing said frame assembly and heated laminate in said die press and forming said laminate into said contoured shape by said die member.

4. The method of forming a permanently deep drawn contour in a laminate as defined in claim 3, wherein said woven finish sheet is bonded to said thermoplastic sheet by applying an adhesive to said thermoplastic sheet, then applying said woven finish sheet to said thermoplastic sheet, permanently bonding said woven finish sheet to said thermoplastic sheet.

5. The method of forming a permanently deep drawn contour in a laminate as defined in claim 3, wherein said woven finish sheet is a carpet section, said method including applying an adhesive to the back surface of said carpet section and bonding said carpet section to said thermoplastic sheet.

6. A method of forming a permanently deep drawn contour in a laminate having a woven finish sheet permanently bonded on a thermoplastic sheet, said method comprising the following steps:

(a) forming a laminate by bonding a woven finish sheet having outer sides along at least two opposed sides on a larger thermoplastic sheet having outer sides along at least two opposed sides, said woven finish sheet having a width which is less than the width of said thermoplastic sheet, whereby said outer sides of said woven finish sheet are spaced apart from said outer sides of said thermoplastic sheet to separate said woven finish sheet from said thermoplastic sheet by side margins of said thermoplastic sheet on opposed sides of said woven finish sheet;

(b) releasably clamping said thermoplastic sheet in a frame assembly, said frame assembly having opposed spaced side members, clamping means releasably clamping said side margins of said thermoplastic sheet to said side members and said frame assembly including a hinged portion hingedly attached to said side members independently supporting a portion of said laminate, said frame assembly hinged portion located adjacent the area where the deepest draw is to be formed in said laminate;

(c) heating said laminate in said frame assembly to soften said thermoplastic sheet to the forming temperature;

(d) placing said frame assembly and heated laminate in a die press having at least one contoured die member, said die member receivable between said frame assembly side members and said die member having an area of greatest contour adjacent said frame assembly hinged portion;

(e) relatively moving said die member into forming engagement with said heated laminate between said frame assembly side members, said woven finish sheet floating on said thermoplastic sheet as said thermoplastic sheet is formed by said die member and said frame assembly hinged portion moving relative to said side members to approximately midway between the areas of greatest contour of said die member; and (f) cooling to harden said laminate in the contoured shape of said die member.

7. The method of forming a permanently deep drawn contour in a laminate as defined in claim 6, wherein said die press includes opposed relatively movable mating contoured male and female die members, said method including closing said die press by relatively moving said die members into forming engagement with said heated laminate between said frame assembly side members.

8. The method of forming a permanently deep drawn contour in a laminate as defined in claim 7, wherein said opposed die members include mating side margins spaced inwardly from said frame assembly side members to engage side portions of said woven finish sheet, said method including relatively closing said die members and said die member side margins engaging said woven finish sheet side portions adjacent said thermoplastic sheet side margins, stretching and thinning said thermoplastic sheet side margins but retaining the original thickness of said thermoplastic sheet where it is bonded to said woven finish sheet.

9. The method of forming a permanently deep drawn contour in a laminate as defined in claim 6, wherein said frame assembly includes a carrier frame including said side members, said hinged frame portion located adjacent at least one end of said frame assembly and including side portions hingedly attached to said side members and an end portion receiving a free end portion of said thermoplastic sheet spaced from said woven finish sheet, said method including releasably clamping said thermoplastic sheet end portion to said frame assembly hinged end portion and said frame assembly hinged end portion rotating about the axis of the hinge connection to said side members, thereby floating in said die press to approximately midway between the areas of greatest and least contour of said die member.

10. The method of forming a permanently deep drawn contour in a laminate as defined in claim 9, wherein said frame assembly includes hinged portions at the opposed ends of said side members and said method includes releasably clamping both free end portions of said thermoplastic sheet to said end portions of said hinge portions.

11. A method of forming a permanently deep drawn contour in a laminate, said laminate having a carpet and a thermoplastic sheet permanently bonded to said carpet, said method comprising the following steps:
 (a) forming said laminate by permanently bonding a thermoplastic sheet having an outer edge around the entire circumference thereof on the back of a carpet having an outer edge around the entire circumference thereof, said thermoplastic sheet having a greater width and length than said carpet and said method including bonding said carpet to said thermoplastic sheet, whereby said outer edge of said woven finish sheet is spaced from at least a portion of said outer edge of said thermosetting sheet and separated along the sides and at least one end of said thermoplastic sheet with said thermoplastic sheet having an end margin and side margins;
 (b) releasably clamping said thermoplastic sheet of said laminate in a frame assembly, said frame assembly having opposed spaced side members and at least one hingedly end portion, said hinged end portion including side portions hingedly attached to said spaced side members and a free end portion, and said frame assembly including clamping means releasably clamping said side and end margins of said thermoplastic sheet to said side members of said frame assembly and said free end portion of said hinged portion, respectively;
 (c) heating said laminate in said frame assembly to soften said thermoplastic sheet to the forming temperature;
 (d) placing said frame assembly and heated laminate in a die press having at least one relatively movable contoured die member, said die member receivable between said side members and said free end portion of said hinged portion and said die member having an area of greatest contour adjacent said hinged end portion of said frame assembly;
 (e) relatively moving said frame member and die member bringing said die member into forming engagement with said heated laminate, said carpet floating on said thermoplastic sheet as said die member is brought into forming contact with said laminate and said frame assembly free end portion rotating about the hinged connection to said side members to approximately midway between the areas of greatest and least contour of said die member; and
 (f) cooling to harden said laminate in the contoured shape of said die member.

12. The method of forming a permanently deep drawn contour in a laminate as defined in claim 11, wherein said die press includes opposed relatively movable mating contoured male and female die members receivable between said side members, said method including closing said die press by relatively moving said die members into forming engagement with said heated laminate between said frame side members and said free end portion.

13. The method of forming a permanently deep drawn contour in a laminate as defined in claim 12, wherein said die members include mating side margins spaced inwardly from said frame assembly side members to engage the side portions of said carpet and thermoplastic laminate, said method including closing said die press by relatively moving said die members and bringing said die member side margins into mating contact with said laminate side portions, thereby stretching said thermoplastic sheet side margins while retaining the original thickness of said thermoplastic sheet where bonded to said carpet.

14. The method of forming a permanently deep drawn contour in a laminate as defined in claim 11, wherein said laminate is formed by applying adhesive to said carpet back surface and said thermoplastic sheet, then applying said carpet to said thermoplastic sheet.

15. The method of forming a permanently deep drawn contour in a laminate as defined in claim 11, wherein said frame assembly includes a hinged end portion at both ends of said frame assembly, each hinged end portion including side portions hingedly attached to said side members and a free end portion and said laminate including an exposed thermoplastic end margin at both of its ends, said method including releasably clamping said thermoplastic side margins to said frame assembly side members and said thermoplastic end margins to said free ends of said hinged end portions and forming said laminate with a die member having areas of greatest contour at the opposed ends of said die member.

* * * * *